R. R. WEAVER.
DUMPING CAR.
APPLICATION FILED NOV. 28, 1911.
1,022,521.
Patented Apr. 9, 1912.
3 SHEETS—SHEET 2.
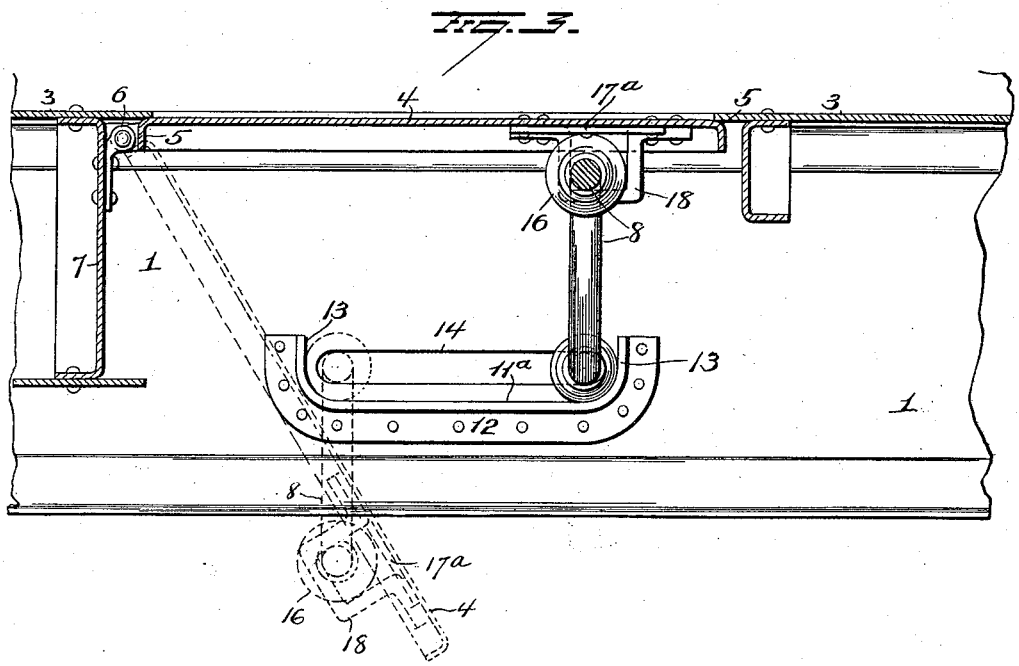
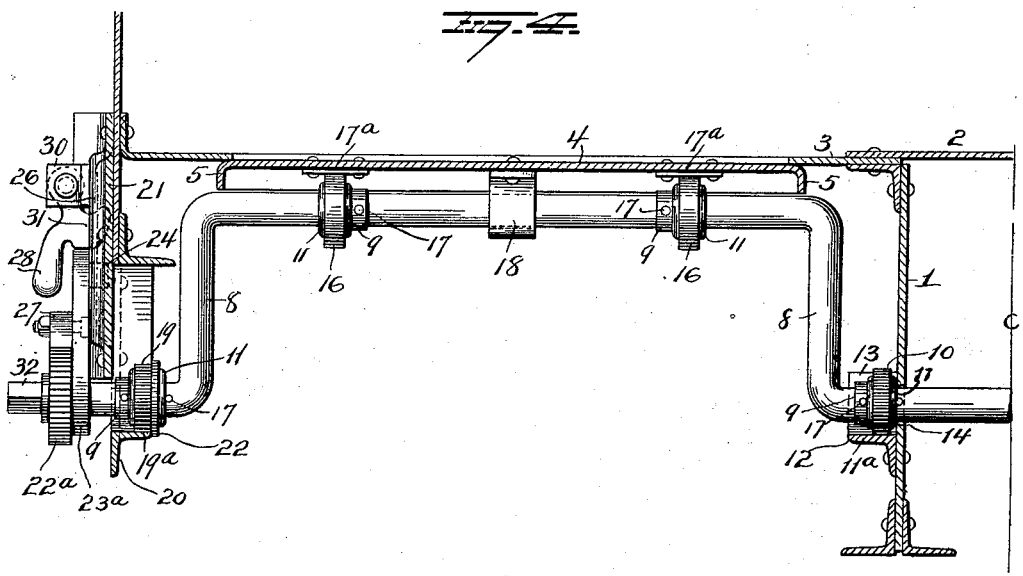

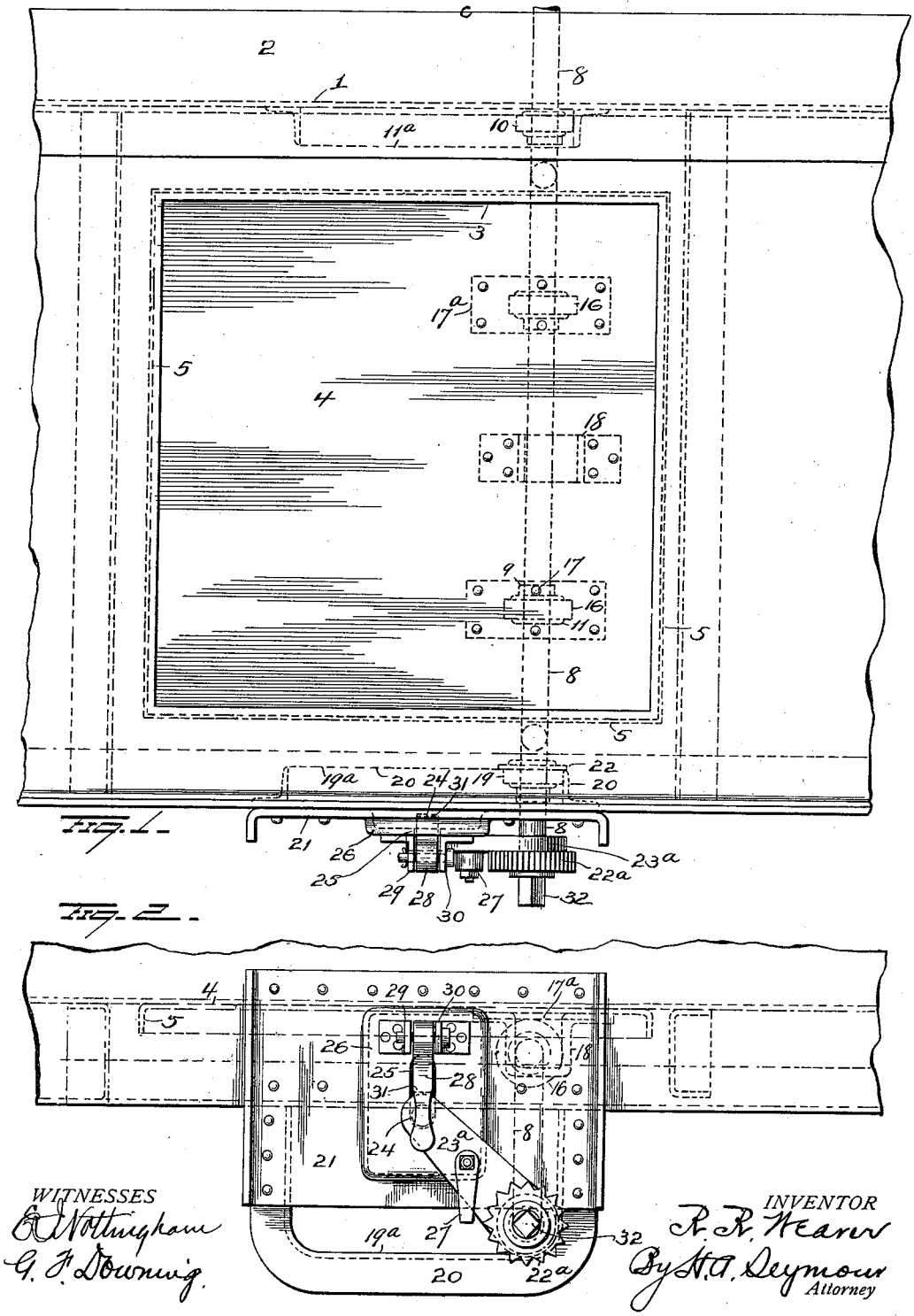

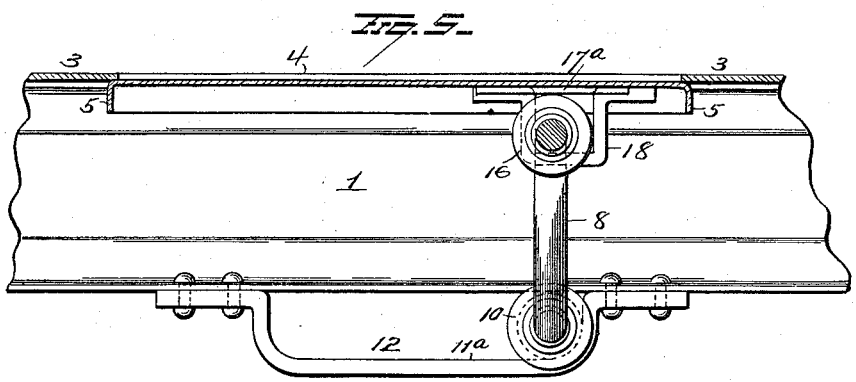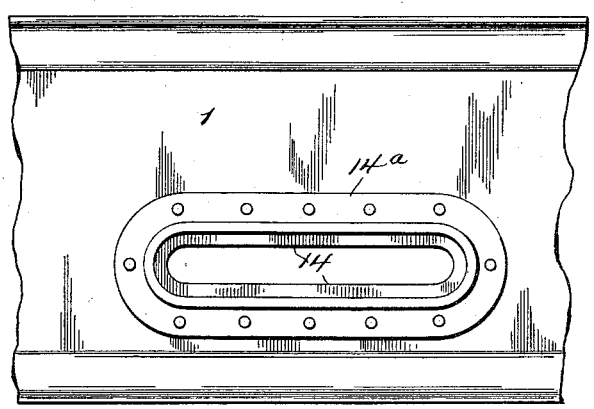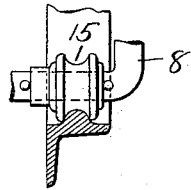

UNITED STATES PATENT OFFICE.

ROBERT R. WEAVER, OF COLUMBUS, OHIO, ASSIGNOR TO THE RALSTON STEEL CAR COMPANY, OF COLUMBUS, OHIO.

DUMPING-CAR.

1,022,521.  Specification of Letters Patent.  Patented Apr. 9, 1912.

Application filed November 28, 1911. Serial No. 662,887.

*To all whom it may concern:*

Be it known that I, ROBERT R. WEAVER, a citizen of the United States, residing at Columbus, in the county of Franklin and State of Ohio, have invented certain new and useful Improvements in Dumping-Cars; and I do hereby declare the following to be a full, clear, and exact description of the invention, such as will enable others skilled in the art to which it appertains to make and use the same.

My invention relates to an improvement in dumping cars and especially to mechanism for actuating the drop doors of flat floor dumping cars.

The object of the invention is to provide the drop doors of dumping cars with actuating mechanism so constructed as to permit the doors to be widely opened and thereby facilitate the ready discharge of the contents of the car.

A further object of the invention is to provide a crank-shaft door actuating mechanism so constructed and mounted that a crank-shaft having a comparatively short crank-arm may be utilized to operate the dump door throughout a wide range of movement.

A further object of the invention is to provide simple, durable and efficient dump door actuating mechanism so constructed as to permit the dump doors to have a wide range of movement.

With these objects in view the invention consists in the construction and arrangement of parts pointed out in the claims.

In the accompanying drawings, Figure 1 is a plan view of a portion of the flat floor of a dump car provided with my improvement. Fig. 2 is a view in side elevation of a portion of a car showing the mechanism for locking the crank-shaft against accidental displacement. Fig. 3 is a transverse sectional elevation of the crank-shaft showing the dump door in its closed and open positions. Fig. 4 is a side elevation of the crank-shaft and its actuating mechanism, and Figs. 5, 6, and 7 are modifications.

In the particular embodiment of my invention shown in the drawings the dump doors are hinged transversely to the length of the car and discharge the load between the rails. But as will be hereinafter explained the improvement may be applied to doors hinged longitudinally of the car so as to discharge the load outside the rails.

1 represents one of the vertical longitudinal members of the center girder, which are joined at their upper edges by a cover plate 2, a floor plate 3 being interposed and secured between the floor plate and girder. The floor plate 3 serves to close the space between the center girder and inside edge of the door.

4 is the dump door which may be made of sheet metal and provided with depending flanges 5 at its sides and ends, to impart to it the necessary stiffness and rigidity. It is hinged to brackets 6 riveted to the cross-beam 7 of the underframe.

8 is a crank-shaft the inner end of which is provided with a split sleeve 9 on which is journaled an anti-friction roller 10 which is held in place by means of the collar 11. The anti-friction roller 10 is supported by and travels upon a longitudinal track-way 11ª on the elongated bracket 12 which is securely riveted to the inner surface of one member of the center sill. The opposite ends 13 of bracket 12 are upwardly turned to limit the travel of the roller. In the event a deep center sill or girder is employed, it is provided with an elongated slot 14 for the passage and travel of the crank-shaft, but should the crank arms be of substantially the same length as the depth of the center girder, the elongated slot would be unnecessary, as the bracket 12 might then be secured to and depend from the underside of the center girder as shown in Fig. 5. Instead of employing an angle iron bracket 12 as a track-way for the roller on the crank-shaft, a casting 14ª, as shown in Fig. 6 may be used for this purpose. The casting may be of any desired shape and be riveted to the center girder both above and below the elongated slot formed therein, so as to strengthen it all sufficient to compensate for the material removed therefrom in forming the elongated slot. The anti-friction roller 10 instead of being formed with a flat periphery, may have a concave periphery 15 and travel on a track convex in cross-section as shown in Fig. 7, which construction will assist in restraining the crank-shaft against longitudinal displacement.

The crank-arm is provided with two or more anti-friction rollers 16 each of which is journaled on a split sleeve 9 and held in place thereon by means of collars 11, and cotter pin 17. These anti-friction rollers 16 engage wearing plates 17$^a$ riveted to the underside of the dump-door. To the underside of the door is riveted a slotted bracket 18 which serves to retain the crank-arm against accidental displacement, but which is of sufficient length to afford the crank arm limited movement toward and away from the outer end of the door for a purpose which will be hereinafter explained.

The outer end of the crank-shaft is provided with an anti-friction roller 19 which is journaled upon a split sleeve 9 and secured in place thereon by means of collars 11, and cotter pin 17. Anti-friction roller 19 travels upon a track-way 19$^a$ formed on an angle-iron bracket 20 which depends from the side of the car and is riveted to a plate 21 which in turn is securely riveted to the car side. The anti-friction roller 19 is provided with a flange 22, which engages the inner edge 23 of track-way 19$^a$, and thereby assists in retaining the crank-shaft against longitudinal movement or displacement. Upon the outwardly projecting end of the crank-shaft is rigidly secured a ratchet wheel 22$^a$. Upon the crank-shaft adjacent to the ratchet-wheel is journaled the lower end of a locking arm 23$^a$, the upper end of which is provided with a lug 24 which projects into a vertical slot 25 formed in the outwardly bulged portion 26, of plate 21. Upon the locking arm 23$^a$ is pivoted a reversible pawl 27 which may be thrown into engagement with the ratchet and thus securely lock it against rotation.

28 is a supplemental locking pawl hinged at its upper end to a pair of angle brackets 29—30, its lower end being provided with a projection 31, of proper form and size to fit the unoccupied portion of slot 25 when the locking arm 23$^a$ is in the position which it assumes when the dumping door is raised and secured in its locked position.

In the drawings the crank-shaft as illustrated is applied to a single door, but in practice it may extend through the two members of the center sill or girder, and be provided with crank-arms on each side of the center sill thereby adapting it to simultaneously actuate two dumping doors, one on each side of the center sill. Instead of mounting the crank-arm transversely to the length of the car in the manner shown and described, it may be mounted lengthwise of the car so as to actuate doors so hinged as to discharge the load outside the rails, and in such construction the crank-shaft is mounted on elongated brackets secured to or near the outer ends of the cross-frame of the underframe.

The operation of the improved door-actuating and locking mechanism is as follows: When the doors are closed and locked and it is desired to dump the load, the operator applies a lever or wrench to the squared end 32 of the crank-shaft, and after moving the supplemental locking pawl 28 outwardly from the slot 25, and also disengaging the pawl 27 from the ratchet wheel 22$^a$, rotates the crank-shaft sufficiently to cause the crank arm which is in a vertical position when locked outwardly to move past its dead center and toward the free end of the door with the result that the weight on the door will cause it to fall and move the crank-shaft to the opposite end of its elongated bearings, the vertical slot 25 permitting the locking arm to slide upwardly therein as the crank-shaft is thrown from one end to the other of its elongated supporting brackets, and to assume a reversed position. When the door has dropped to its open position which is represented in dotted lines in Fig. 3, it will be sharply inclined and afford a free discharge of the load. When the door is in its open position, the crank-shaft and crank-arm will be in the position shown in dotted lines in Fig. 3. The crank-arm will depend vertically and by reason of its engagement with the bracket beneath the door will support the latter in its sharply inclined position. The parts may be locked in their open position by means of the ratchet and pawl, and additionally by the supplemental locking dog. By rotating the crank-shaft in the opposite direction, the crank-arm will raise the door to its closed position and the crank-shaft will be moved to the opposite ends of its elongated supporting brackets as illustrated in Fig. 3.

It is obvious that slight changes may be made in the form, construction and arrangement of the several parts of my improvement without departing from the spirit of the invention and hence I would have it understood that I do not restrict myself to the particular construction and arrangement of parts shown and described.

Having fully described my invention what I claim as new and desire to secure by Letters-Patent, is:

1. The combination with a dumping door, of a crank shaft mounted to move toward and from the free end of the door, and means secured to the underside of the door for permitting backward and forward movement of the crank arm and for causing it to move with the door in opening and closing.

2. The combination with a dumping door, of a crank shaft mounted to move toward and from the free end of the door, and a bracket secured to the underside of the door, and permitting the crank arm to move only slightly in either direction past its dead center when the door is closed, and for causing the crank arm to move with the door in opening and closing.

3. The combination with a dumping door and trackways located beneath the door, of a crank shaft supported and adapted to travel to and fro upon said trackways, and brackets secured to the underside of the door and adapted to permit the crank arm to move only slightly in either direction past its dead center when the door is closed and for causing the crank arm to be moved by the door when the latter is opening and closing.

4. The combination with a dumping door and stationary trackways located beneath the door, of a crank-shaft supported and adapted to travel to and fro upon said trackways, and means attached to the underside of the door and adapted to permit the crank arm to move only slightly in either direction past its dead center when the door is closed and for causing the crank arm to be moved by the door when the latter is opening and closing.

5. The combination with a dumping door and stationary trackways located beneath the door, of a crank-shaft provided with roller bearings which are supported and adapted to travel upon said bearings, and means for connecting the crank-arm with the underside of the door and for permitting it to move outwardly past its dead center when the door is closed and for causing the crank arm to be moved by the door when the latter is opening and closing.

6. The combination with a dumping door and stationary trackways located beneath the door, of a crank-shaft supported and adapted to travel to and fro upon said trackways, means for connecting the crank-arm with the underside of the door and for permitting it to move outwardly past its dead center, and means for locking the crank-shaft against accidental displacement.

7. The combination with a dumping door and stationary trackways provided with end stops, of a crank-shaft supported and adapted to travel to and fro upon said trackways, and means for connecting the crank arm with the underside of the door and for permitting it to move only slightly outwardly past its dead center, and to cause it to be moved by the door when the latter is opening and closing.

8. The combination with a dumping door and stationary trackways, of a crank-shaft provided with rollers which are supported and travel on said trackways, means for connecting the crank arm with the underside of the door and for permitting it only a slight movement in either direction past its dead center, and means for locking the crank-shaft against rotation.

9. The combination with a dumping door and stationary trackways located beneath the door, of a crank-shaft provided with anti-friction rollers which are supported on said trackways, anti-friction rollers journaled on the crank-arm, and brackets secured to the underside of the door which permit the crank arm to move only slightly past its dead center.

10. The combination with a dumping door, a crank-shaft and means for supporting the crank-shaft and permitting it to move toward and from the free end of the door, of a ratchet secured to the crank shaft, a locking arm journaled at one end on the crank-shaft and provided with a projection at its opposite end which engages a slot in the underframe, and a pawl on the locking-arm for locking the ratchet against rotation.

11. The combination with a dumping door and a crank-shaft mounted to move bodily toward and from the free end of the dumping door, of a locking arm connected at one end with the crank-shaft and at its other end with a slotted plate, and a locking dog adapted to be moved into and out of engagement with the locking arm.

12. The combination with a dumping door and stationary trackways provided with end stops, of a crank-shaft supported and adapted to travel on said trackways, means for connecting the crank arm with the underside of the door and for permitting only a slight movement of the crank-arm past its dead center, and means connected with the crank-shaft for imparting rotary motion thereto.

13. In a dump car, the combination with a crank-shaft, a trackway for supporting one end of the crank-shaft, a ratchet wheel secured to the crank-shaft, a locking arm journaled on the crank-shaft, a reversible pawl pivoted to the locking-arm, and a bulged out plate provided with a vertical slot with which engages the upper end of the locking arm.

14. The combination with a dumping door and stationary trackways beneath the door, of a crank-shaft provided with roller trackways which are supported and travel upon said trackways, means for connecting the crank-arm with the underside of the door and permitting it to move only slightly past its dead center, and means attached to the end of the crank-shaft for imparting movement thereto.

15. The combination with a crank-shaft, a locking arm journaled thereon and provided with a projection which engages in a vertical slot and is adapted to move vertically therein, of a locking dog adapted to be thrown into and out of said slot.

In testimony whereof, I have signed this specification in the presence of two subscribing witnesses.

ROBERT R. WEAVER.

Witnesses:
B. C. HANNA,
FRANK M. COWGILL.

Copies of this patent may be obtained for five cents each, by addressing the "Commissioner of Patents, Washington, D. C."